(12) United States Patent
Wu et al.

(10) Patent No.: US 9,053,753 B2
(45) Date of Patent: Jun. 9, 2015

(54) METHOD AND SYSTEM FOR A FLEXIBLE MULTIPLEXER AND MIXER

(75) Inventors: David Wu, San Diego, CA (US); Cam Minh Luu, San Diego, CA (US); Glen Grover, Poway, CA (US); Benjamin Giese, Oceanside, CA (US); Shu Chan, San Diego, CA (US); Keith Klingler, Poway, CA (US); Darren Neuman, Palo Alto, CA (US)

(73) Assignee: BROADCOM CORPORATION, Irvine, CA (US)

( * ) Notice: Subject to any disclaimer, the term of this patent is extended or adjusted under 35 U.S.C. 154(b) by 2039 days.

(21) Appl. No.: 11/558,229

(22) Filed: Nov. 9, 2006

(65) Prior Publication Data

US 2008/0114479 A1    May 15, 2008

(51) Int. Cl.
| | |
|---|---|
| *G06F 17/00* | (2006.01) |
| *G11B 27/30* | (2006.01) |
| *G10L 19/008* | (2013.01) |
| *G11B 27/038* | (2006.01) |
| *G11B 20/10* | (2006.01) |
| *G06F 3/16* | (2006.01) |
| *G06T 1/20* | (2006.01) |
| *H04H 60/27* | (2008.01) |

(52) U.S. Cl.
CPC ...... *G11B 27/3027* (2013.01); *G11B 20/10527* (2013.01); *G06F 3/162* (2013.01); *G06F 3/165* (2013.01); *G11B 20/10* (2013.01); *G11B 2020/10537* (2013.01); *G06T 1/20* (2013.01); *G11B 2020/10546* (2013.01); *H04H 60/27* (2013.01); *G10L 19/008* (2013.01); *G11B 27/038* (2013.01); *G11B 2220/2541* (2013.01); *G11B 2220/2579* (2013.01)

(58) Field of Classification Search
CPC ............ G11B 20/10; G11B 20/10527; G11B 2020/10546; G11B 2020/10537; G06F 3/162; G06F 3/165; G06T 1/20; H04H 60/27
USPC ............................................. 700/94; 381/119
See application file for complete search history.

(56) References Cited

U.S. PATENT DOCUMENTS

| | | | | |
|---|---|---|---|---|
| 6,119,091 A | * | 9/2000 | Huang et al. ................... | 704/500 |
| 6,128,597 A | * | 10/2000 | Kolluru et al. ................ | 704/500 |
| 6,310,652 B1 | * | 10/2001 | Li et al. ......................... | 348/515 |
| 6,754,714 B1 | * | 6/2004 | Chebrolu ...................... | 709/229 |
| 6,953,887 B2 | * | 10/2005 | Nagashima et al. ............ | 84/645 |

(Continued)

FOREIGN PATENT DOCUMENTS

| | | |
|---|---|---|
| EP | 1499047 A2 | 1/2005 |
| EP | 1713075 A1 | 10/2006 |
| WO | 2004/054320 A2 | 6/2004 |

OTHER PUBLICATIONS

ID3v2 technical specification copyright Mar. 26, 1998.*

(Continued)

*Primary Examiner* — Paul McCord
(74) *Attorney, Agent, or Firm* — Foley & Lardner LLP; Christopher J. McKenna

(57) ABSTRACT

Certain aspects of a method and system for a flexible multiplexer and mixer (FMM) are disclosed. Aspects of one method may include mixing primary audio information and secondary audio information of sampled received audio data based on corresponding metadata information to generate mixed output audio data. The generated mixed output audio data may be pulled through a plurality of pipeline stages.

24 Claims, 7 Drawing Sheets

(56) References Cited

U.S. PATENT DOCUMENTS

| | | | |
|---|---|---|---|
| 7,020,488 B1* | 3/2006 | Bleile et al. | 455/557 |
| 7,119,724 B1* | 10/2006 | Asami | 341/118 |
| 7,129,408 B2* | 10/2006 | Uehara | 84/645 |
| 7,254,644 B2* | 8/2007 | Norimatsu et al. | 709/248 |
| 7,297,858 B2* | 11/2007 | Paepcke | 84/609 |
| 2005/0216262 A1* | 9/2005 | Fejzo | 704/217 |
| 2006/0173691 A1* | 8/2006 | Mukaide | 704/500 |
| 2007/0011004 A1* | 1/2007 | Liebchen | 704/229 |

OTHER PUBLICATIONS

Kuroda, Nishitani, Asynchronous Multirate System Design, copyright 1992, IEEE Sep. 1992.*

European Search Report of co-pending, related European Patent Application No. EP 07012715, mailed Jan. 17, 2012.

* cited by examiner

METHOD AND SYSTEM FOR A FLEXIBLE MULTIPLEXER AND MIXER

CROSS-REFERENCE TO RELATED APPLICATIONS/INCORPORATION BY REFERENCE

This application makes reference to:
U.S. patent application Ser. No. 11/558,145 filed on Nov. 9, 2006;
U.S. patent application Ser. No. 11/558,168 filed on Nov. 9, 2006; and
U.S. patent application Ser. No. 11/558,191 filed on Nov. 9, 2006.

Each of the above referenced applications is hereby incorporated herein by reference in its entirety.

FIELD OF THE INVENTION

Certain embodiments of the invention relate to multi-channel interfaces. More specifically, certain embodiments of the invention relate to a method and system for a flexible multiplexer and mixer.

BACKGROUND OF THE INVENTION

With the development of optical disk technology, larger amounts of audio and/or video data may be stored in a single disk when compared to other technologies such as magnetic recording, for example. Recent developments continue to expand the capabilities of optical disks by enabling higher data storage capacity within a single disk. For example, Blu-ray optical disk technology may utilize blue lasers to read and write to the disc. A Blu-ray disc may store substantially more data than, for example, a digital versatile disk (DVD) or a compact disk (CD), because of the shorter wavelength, approximately 405 nm, of the blue laser compared to the 650 nm wavelength for red lasers used by DVDs and the 780 nm wavelength for infrared lasers used by CDs. The use of shorter wavelengths enables more information to be stored digitally in the same amount of space. In comparison to high-definition digital versatile disk (HD-DVD), which also uses a blue laser, Blu-ray technology may enable more information capacity per optical disk layer.

For Blue-ray applications, coders/decoders (codecs) may be utilized to compress and/or decompress audio and video information to be stored and/or retrieved from optical discs. For video applications, standalone Blu-ray players may be able to decode various codec formats, such as, MPEG-2, which is also used for DVDs, H.264/AVC, a newer codec developed jointly by ISO/IEC's MPEG and ITU-T's VCEG, and/or VC-1, a codec based on Microsoft's Windows Media 9. For audio applications, Blu-ray players may support Dolby Digital, digital theater system (DTS), and linear pulse code modulation (PCM), up to 7.1 channels, for example. Blu-ray players may also support Dolby Digital Plus and lossless formats such as Dolby TrueHD and DTS HD, for example. In some instances, the Blu-ray player may need to support the linear PCM 5.1, Dolby Digital 5.1 and DTS 5.1 bitstream formats as one of them may be used as the sole soundtrack on a disc. For lossless audio in movies in the PCM, Dolby TrueHD or DTS-HD formats, Blu-ray discs may support encoding of up to 24-bit/192 kHz for up to six channels or up to 24-bit/96 kHz for up to eight channels.

In HD-DVD audio applications, up to 7.1 channels of surround sound may be mastered using the linear (uncompressed) PCM, Dolby Digital, and DTS formats also used on DVDs. Moreover, HD-DVD players may also support Dolby Digital Plus and lossless formats such as Dolby TrueHD and DTS HD, for example. On HD-DVD applications, the Dolby formats such as Dolby Digital or Dolby Digital Plus track, for example, may be used as the sole soundtrack on a disc. For lossless audio in movies in the PCM, Dolby TrueHD or DTS-HD formats, HD-DVD discs may support encoding of up to 24-bit/192 kHz for two channels or of up to 24-bit/96 kHz encoding for eight channels.

In digital systems, a PCM time sharing coding may be utilized for the transmission of data, which may allow simultaneous transmission of a plurality of signals on a single line, as groups of binary signals, in defined time intervals. These digital systems may require the presence of a processing unit, which may control various units in the system for allowing communication between the central processing unit and the various units by means of a PCM bus comprising one or more PCM channels. Coding and/or decoding systems that provide sufficient architectural flexibility and efficiency to support the requirements of new optical storage technologies, such as Blue-ray and/or HD-DVD, for example, may be necessary for the design and implementation of cost-effective consumer products.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a flexible multiplexer and mixer, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a flexible multiplexer and mixer (FMM). Certain aspects of the invention may comprise mixing primary audio information and secondary audio information of sampled received audio data based on corresponding metadata information to generate mixed output audio data. The generated mixed output audio data may be pulled through a data processing path utilized for the generation of the mixed output audio data.

Figure 1A:
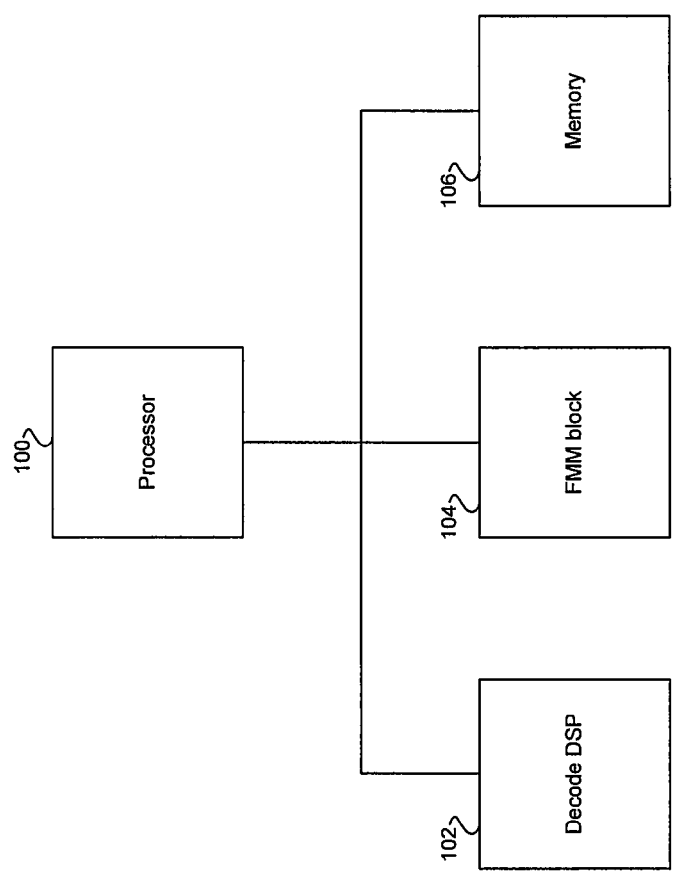
FIG. 1A is a block diagram illustrating an exemplary audio decoding system for Blu-ray and/or high-definition DVD, in accordance with an embodiment of the invention.

FIG. 1A is a block diagram illustrating an exemplary audio decoding system for Blu-ray and/or high-definition DVD, in accordance with an embodiment of the invention. Referring to FIG. 1A, there is shown a system for audio decoding that may comprise a processor 100, a decode digital signal processor (DSP) 102, a flexible audio mixing and muxing (FMM) block 104, and a memory 106. The processor 100 may comprise suitable, logic, circuitry and/or code that may enable control and/or management of operations performed by the decode DSP 102, the FMM block 104, and/or the memory 106. The decode DSP 102 may comprise suitable logic, circuitry, and/or code that may enable decoding of audio information. In this regard, the audio information may be comprised within PCM frames, for example. The output of the decode DSP 102 may be communicated to the FMM block 104. The memory 106 may comprise suitable logic, circuitry, and/or code that may enable storage of data processed by the decode DSP 102 and/or the FMM block 104.

The FMM block 104 may comprise suitable, logic, circuitry and/or code that may enable playback and channel mixing for Blu-ray and/or high-definition DVD (HD-DVD) operations, for example. In this regard, the FMM block 104 may enable playback and channel mixing of up to 7.1 channels primary audio supporting seven primary speakers and a subwoofer that may be referred to as an low frequency effects (LFE) channel, 5.1 channel secondary audio supporting five secondary speakers and a subwoofer, and/or 8 channel of mono sound effects at 96 KHz, for example. In one exemplary embodiment of the invention, the FMM block 104 may enable playback and channel mixing stereo primary audio, stereo secondary audio, and/or stereo or two mono sound effects at 192 KHz, for example. In one exemplary embodiment of the invention, the FMM block 104 may also enable 5.1 channels AC-3 or digital theater system (DTS) encoding for compressed Sony/Philips digital interface (SPDIF), where AC-3 refers to the 5.1-channel sound system specified in the digital-HDTV standard and also known as Dolby Digital.

The FMM block 104 may enable various stages of mixing, for example. A first mixing stage may enable mixing of 7.1 channels primary audio, 5.1 channel secondary audio, and 8 mono stereo channels sound effects. Another mixing stage may enable down-mixing the output of the first mixing stage. In this regard, the FMM block 104 may provide dynamic update of mixing coefficients, synchronization at frame boundary, mixing coefficient smoothing or ramping, and soft limiting for channel mixing.

The FMM block 104 may also enable high-quality sample rate conversion (SRC) for sampling conversion of 48/192, 48/96, 192/48, 96/48, 12/192, 12/96, 12/48, 24/192, 24/96, and 24/48 kHz, for example. Linear interpolation SRC for each input may be supported. The FMM block 104 may also support delay balance between compressed SPDIF, digital-to-analog conversion (DAC) and inter-IC sound (I2S) outputs, for example. Moreover, the FMM block 104 may also support audio watermark detection, Dolby bass management, and DTS speaker management, for example.

Figure 1B:
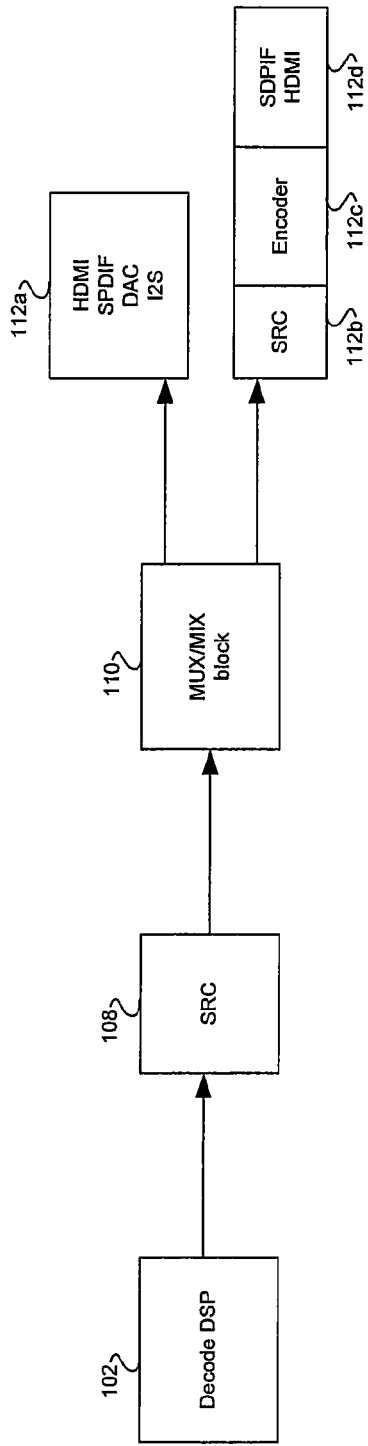
FIG. 1B is a block diagram illustrating an exemplary sequential FMM topology, in accordance with an embodiment of the invention.

FIG. 1B is a block diagram illustrating an exemplary sequential FMM topology, in accordance with an embodiment of the invention. Referring to FIG. 1B, there is shown a sequential architecture or topology for a system that enables playback and channel mixing, wherein the system may comprise an sample rate converter (SRC) 108, a muxing and mixing (MUX./MIX) block 110, an HDMI/SPDIF/DAC/I2S block 112a, an SRC 112b, an encoder 112c, and an SPDIF/HDMI block 112d. The system may also comprise a decode DSP, such as the decode DSP 102 disclosed in FIG. 1A.

The SRC 108 may comprise suitable logic, circuitry, and/or code that may enable sample rate conversion of data provided by the decode DSP 102. The MUX/MIX block 110 may comprise suitable logic, circuitry, and/or code that may enable mixing and/or of multiplexing data provided by the SRC 108. The MUX/MIX block 110 may communicate the processed data to the HDMI/SPDIF/DAC/I2S block 112a and/or to the SRC 112b, for example. The HDMI/SPDIF/DAC/I2S block 112a may comprise suitable logic, circuitry, and/or code that may enable processing of data in at least one of a plurality of formats such as high definition multimedia interface (HDMI), SPDIF, DAC, and/or I2S, for example. The SRC 112b may comprise suitable logic, circuitry, and/or code that may enable sample rate conversion of data provided by the MUX/MIX block 110. The encoder 112c may comprise suitable logic, circuitry, and/or code that may enable encoding of the sample rate converted data from the SRC 112b. The SPDIF/HDMI block 112d may comprise suitable logic, circuitry, and/or code that may enable processing of the encoded data generated by the encoder 112c in at least one of a plurality of formats such as high definition multimedia interface (HDMI) and SPDIF, for example.

Communication from the decode DSP 102 to the SRC 108 and from the SRC 108 to the MUX/MIX block 110 may occur via a plurality of channels such as 22 channels, for example. Communication from the MUX/MIX block 110 to the HDMI/SPDIF/DAC/I2S block 112a may occur via 14 channels and to the SRC 112b may occur via 8 channels, for example.

The sequential topology disclosed in FIG. 1B may utilize a single path with down-mixing, decoding output, and encoding output in a serial pipeline scheme. In some instances, while this topology may be less costly by sharing the mixing output, it may also result in a more complex system and/or software design, such as TSM or host PI configuration, for example, due to delay dependency between decoding outputs and encoding inputs. In other instances, an independent topology, such as the one disclosed in FIG. 1C, may be more costly due to separate mixing functions for both decoding output and encoding input, but it may result in a more efficient system and/or software design due to the independent delay between decoding path and encoding path.

Figure 1C:
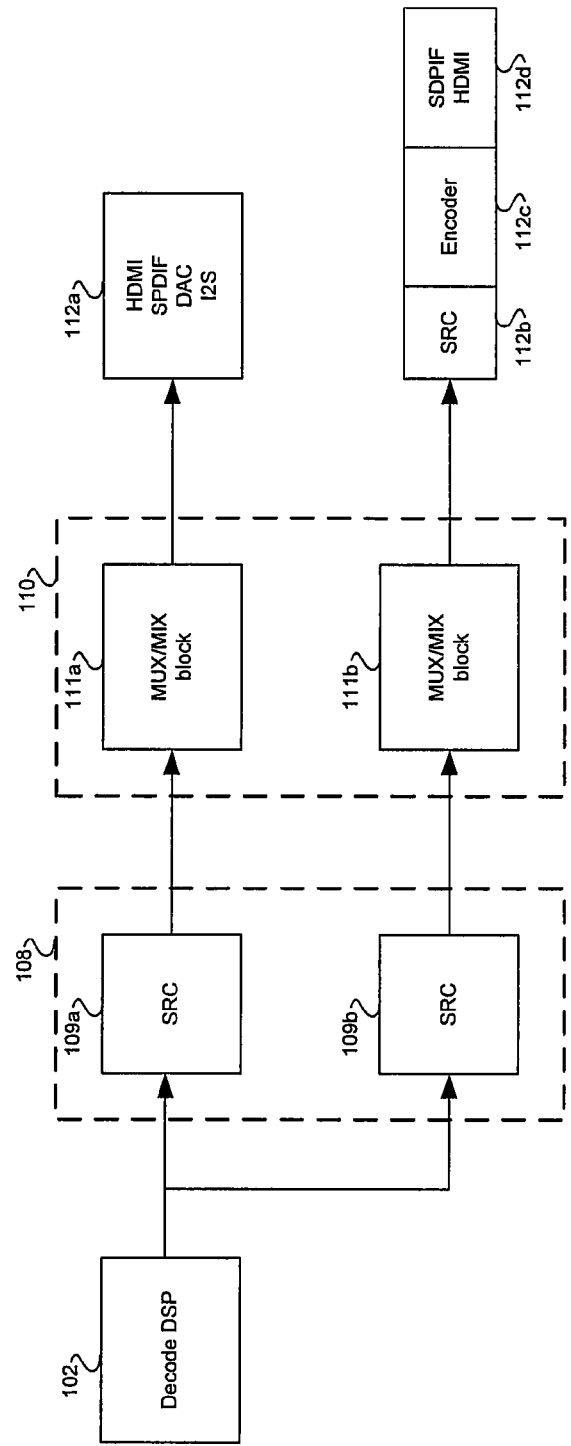
FIG. 1C is a block diagram illustrating an exemplary independent FMM topology, in accordance with an embodiment of the invention.

FIG. 1C is a block diagram illustrating an exemplary independent FMM topology, in accordance with an embodiment of the invention. Referring to FIG. 1C, there is shown an independent architecture or topology for a system that enables playback and channel mixing, wherein the system may comprise an SRC 108 and a MUX/MIX block 110. The system may also comprise the HDMI/SPDIF/DAC/I2S block 112a, the SRC 112b, the encoder 112c, the SPDIF/HDMI block 112d, and the decode DSP 102 disclosed in FIG. 1B. The SRC 108 may comprise a first SRC 109a and a second SRC 109*b*. The MUX/MIX block 110 may comprise a first MUX/MIX block 111*a* and a second MUX/MIX block 111*b*.

The SRCs 109*a*, 109*b* may comprise suitable logic, circuitry, and/or code that may enable sample rate conversion of data provided by the decode DSP 102. The MUX/MIX blocks 111*a*, 111*b* may comprise suitable logic, circuitry, and/or code that may enable mixing and/or multiplexing data provided by the SRCs 109*a*, 109*b* respectively. The MUX/MIX blocks 111*a*, 111*b* may communicate the processed data to the HDMI/SPDIF/DAC/I2S block 112*a* and to the SRC 112*b*, respectively. Communication from the decode DSP 102 to the SRCs 109*a*, 109*b* and from the SRCs 109*a*, 109*b* to the MUX/MIX blocks 111*a*, 111*b* may occur via a plurality of channels such as 22 channels, for example. Communication from the MUX/MIX block 111*a* to the HDMI/SPDIF/DAC/I2S block 112*a* may occur via 14 channels and from the MUX/MIX block 111*b* to the SRC 112*b* may occur via 8 channels, for example.

In some instances, post processing functions, such as speaker management (SM) and audio watermark detection, for example, may require that the mixed multi-channels be routed back through to memory ring buffers, such as DRAM buffers, and played back again through a flexible audio mixing and muxing (FMM) processing. In this regard, delay balance between the outputs that result from post processing and those without post processing may be necessary. Since the number of playbacks and captures may be less for a sequential topology when post processing is enabled, both sequential and independent topologies may be utilized for a system that enables playback and channel mixing of audio signals such as those for Blu-ray and/or HD-DVD operations. In some instances, the independent topology may be more suitable when dual decoding and encoding are enabled while the independent topology may be more suitable when dual decoding and post processing of speaker management and audio watermark detection are enabled.

For 48 KHz playback and channel mixing systems, the mixer and multi-channel outputs may operate at the sampling rate of 48 KHz. In this regard, input samples at rates other than 48 KHz may be sample rate converted, mixed and played back at 48 KHz. For 96 KHz playback and channel mixing systems, the mixer and multi-channel outputs may operate at the sampling rate of 96 KHz and input samples at rates other than 96 KHz may be sample rate converted, mixed and played back at 96 KHz. Similarly, for 192 KHz playback and channel mixing systems, the mixer and multi-channel outputs may operate at the sampling rate of 192 KHz and input samples at rates other than 96 KHz may be sample rate converted, mixed and played back at 96 KHz.

Figure 1D:
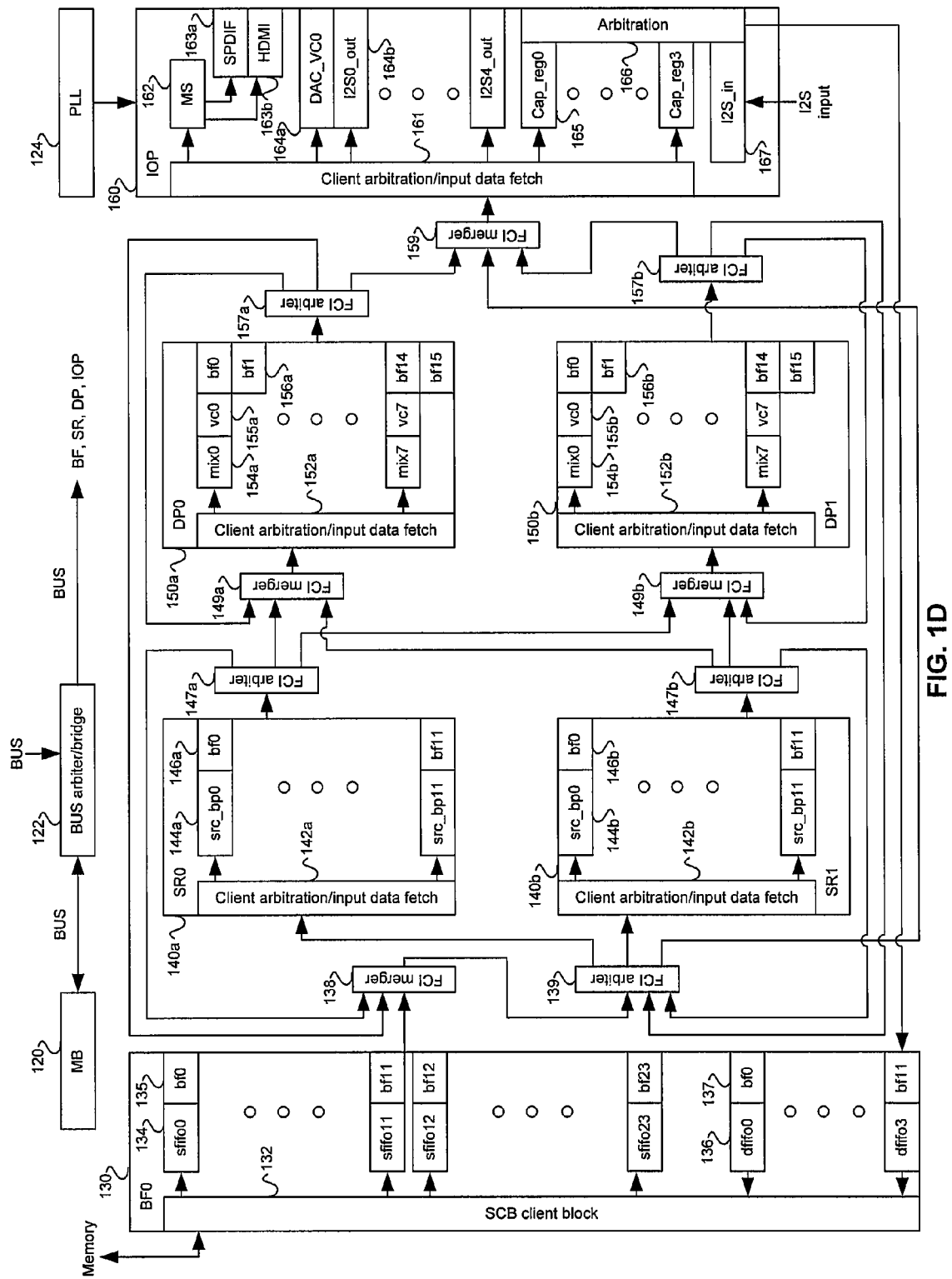
FIG. 1D is a block diagram illustrating an exemplary FMM top-level architecture, in accordance with an embodiment of the invention.

FIG. 1D is a block diagram illustrating an exemplary FMM top-level architecture, in accordance with an embodiment of the invention. Referring to FIG. 1D, there is shown an architectural implementation of the FMM block 104 disclosed in FIG. 1A. The FM block 104 may comprise a metadata block (MB) 120, a BUS arbiter/bridge 122, a buffer block (BFO) 130, a first sample rate converter (SRC) block 140*a*, a second SRC block 140*b*, a first data path (DP) or PCM mixing block (DP0) 150*a*, a second data path block (DP1) 150*b*, an input-output block (IOP) 160, a phase locked loop (PLL) 124, FMM common internal (FCI) interface arbiters 139, 147*a*, 147*b*, 157*a*, and 157*b*, and FCI interface merger blocks 138, 149*a*, 149*b*, and 159.

The exemplary FMM architecture disclosed in FIG. 1B may comprise various types of data flow. One data flow may comprise a decoding data flow from decoding ring buffer to audio playback outputs. Another data flow may comprise an encoding data flow from decoding ring buffer to encoding input ring buffer. The data flows may share the same data pipeline with a data pull model as the flow control. The pipeline stages may include the BF0 130, SRC0 140*a*, SRC1 140*b*, DP0 150*a*, DP1 150*b*, and IOP 160. The data may be rate controlled and/or pulled from the IOP 160. Each of the stages may comprise a single processing unit and multiple small FIFO buffers as the pipeline buffer, for example. Each channel pair may utilize one FIFO buffer. When space is available within a FIFO buffer, the processing unit may process the data to fill the FIFO buffer after the request is granted by the round-robin arbitration among the multiple FIFO buffers.

The MB 120 may comprise suitable logic, circuitry, and/or code that may enable generation of metadata information that may be communicated to other portions of the FM block 104 for processing the audio data. In this regard, the MB 120 may communicate the metadata information, such as a start of frame indicator and/or mixing coefficients, for example, via the BUS arbiter/bridge 122. The MB 120 may communicate metadata information to the BF0 130, the SRC blocks 140*a* and 140*b*, the DP0 150*a* and DP1 150*b*, and/or the IOP 160, for example.

The BF0 130 may comprise a client block 132, a plurality of FIFOs 134 and a plurality of buffers 135. The client block 132 may comprise suitable logic, circuitry, and/or code that may enable communication of data between the FMM 104 and memory, such as the memory 106 in FIG. 1A, for example. In this regard, the memory may be a DRAM memory, for example. The FIFOs 134 may comprise suitable logic, circuitry, and/or code that may enable first-in-first-out data storage operations. The FIFOs 134 may be labeled sfifo0 through sfifo23 for source FIFOs and dfifo0 through dfifo3 for destination FIFOs. The buffers 135 may comprise suitable logic, circuitry, and/or code that may enable data storage. The buffers 135 may be labeled bf0 through bf23 for the buffers associated with the FIFOs sfifo0 through sfifo23 and bf0 through bf3 for the buffers associated with the FIFOs dfifo0 through dfifo3.

The client block 132, the FIFOs sfifo0, sfifo12, and dfifo3, and the buffers bf0, bf12, and bf3 associated with dfifo3, may be shared for encoding and decoding path functions, for example. The FIFOs sfifo1 through sfifo11 and the buffers bf1 through bf11 may be utilized for decoding path functions, for example. The FIFOs sfifo13 through sfifo23 and dfifo0 through dfifo2 and the buffers bf13 through bf23 and bf0 through bf2 associated with the FIFOs dfifo0 through dfifo2 may be utilized for encoding path functions, for example.

The SRC0 140*a* may comprise a client arbitration/input data fetch block 142*a*, a plurality of sample rate controllers 144*a*, and a plurality of buffers 146*a*. The client arbitration/input data fetch block 142*a* may comprise suitable logic, circuitry, and/or code that may enable communication of data between the SRC0 140*a* and the FCI arbiter 139. The sample rate controllers 144*a* may comprise suitable logic, circuitry, and/or code that may enable adjustment of channel rates. The sample rate controllers 144*a* may be labeled src_bp0 through src_bp11. The buffers 146*a* may comprise suitable logic, circuitry, and/or code that may enable data storage. The buffers 146*a* may be labeled bf0 through bf11. The src_bp0 and bf0 may be shared for encoding and decoding path functions while the src_bp1 through src_bp11 and the bf1 through bf11 may be utilized for decoding path functions.

The SRC1 140*b* may comprise a client arbitration/input data fetch block 142*b*, a plurality of sample rate controllers 144*b*, and a plurality of buffers 146*b*. The client arbitration/input data fetch block 142*b* may comprise suitable logic, circuitry, and/or code that may enable communication of data between the SRC1 140*b* and the FCI arbiter 139. The sample rate controllers 144*b* may comprise suitable logic, circuitry, and/or code that may enable adjusting channel rates. The sample rate controllers 144*b* may be labeled src_bp0 through src_bp11. The buffers 146*b* may comprise suitable logic, circuitry, and/or code that may enable data storage. The buffers 146*b* may be labeled bf0 through bf11. The src_bp0 and bf0 may be shared for encoding and decoding path functions while the src_bp1 through src_bp11 and the bf1 through bf11 may be utilized for encoding path functions.

The DP0 150*a* may comprise a client arbitration/input data fetch block 152*a*, a plurality of mixers 154*a*, a plurality of volume controllers (VCs) 155*a*, and a plurality of buffers 156*a*. The client arbitration/input data fetch block 152*a* may comprise suitable logic, circuitry, and/or code that may enable communication of data between the DP0 150*a* and the FCI merger 149*a*. The mixers 154*a* may comprise suitable logic, circuitry, and/or code that may enable various audio mixing operations. The mixers 154*a* may be labeled mix0 through mix7. The volume controllers 155*a* may comprise suitable logic, circuitry, and/or code that may enable volume control during mixing operations. The volume controllers 155*a* may be labeled vc0 through vc7. The buffers 156*a* may comprise suitable logic, circuitry, and/or code that may enable data storage. The buffers 156*a* may be labeled bf0 through bf15. In this regard, two buffers 156*a* may be associated with an audio channel, for example. The mix0, vc0, and bf0 may be shared for encoding and decoding path functions while the mix1 through mix7, vc1 through vc7, and the bf2 through bf15 may be utilized for decoding path functions.

The DP1 150*b* may comprise a client arbitration/input data fetch block 152*b*, a plurality of mixers 154*b*, a plurality of volume controllers (VCs) 155*b*, and a plurality of buffers 156*b*. The client arbitration/input data fetch block 152*b* may comprise suitable logic, circuitry, and/or code that may enable communication of data between the DP1 150*b* and the FCI merger 149*b*. The mixers 154*b* may comprise suitable logic, circuitry, and/or code that may enable audio mixing operations. The mixers 154*b* may be labeled mix0 through mix7. The volume controllers 155*b* may comprise suitable logic, circuitry, and/or code that may enable volume control during mixing operations. The volume controllers 155*b* may be labeled vc0 through vc7. The buffers 156*a* may comprise suitable logic, circuitry, and/or code that may enable data storage. The buffers 156*b* may be labeled bf0 through bf15. In this regard, two buffers 156*b* may be associated with an audio channel, for example. The mix0, vc0, and bf0 may be shared for encoding and decoding path functions while the mix1 through mix7, vc1 through vc7, and the bf2 through bf15 may be utilized for encoding path functions.

The DP0 150*a* and the DP1 150*b* may be utilized to provide operations such as 16 to 1 channel mixing with an 8-channel pair mixer, dual ping-pong coefficient banks, coefficient smoothing, and/or soft limiting in audio mixer. A feed-back loop from the data path (DP) output to the input may allow 7.1 channel PCM from the output of the mixing of primary, secondary and sound effects to be down-mixed further to 5.1 channels for encoding or stereo output, for example.

The IOP 160 may comprise a client arbitration/input data fetch block 161, an MS block 162, an SPDIF block 163*a*, an HDMI block 163*b*, a DAC_VC0 block 164*a*, a plurality of I2S output blocks 164*b*, a plurality of capture registers 165, an arbitration block 166, and an I2S input block (I2S_in) 167. The plurality of I2S output blocks 164*b* may be labeled I2S0_out through I2S4_out, for example. The plurality of capture registers 165 may be labeled cap_reg0 through cap_reg3, for example. The client arbitration/input data fetch block 161 may comprise suitable logic, circuitry, and/or code that may enable communication of data between the IOP 160 and the FCI merger 159. The MS block 162 may comprise suitable logic, circuitry, and/or code that may enable data communication between the client arbitration/input data fetch block 161 and the SPDIF block 163*a* and/or the HDMI block 163*b*. The SPDIF block 163*a* may comprise suitable logic, circuitry, and/or code that may enable processing of audio information in accordance with the Sony/Philips digital interface (SPDIF). The HDMI block 163 may comprise suitable logic, circuitry, and/or code that may enable processing audio information in accordance with the high definition multimedia interface (HDMI).

The DAC_VC0 block 164*a* may comprise suitable logic, circuitry, and/or code that may enable adjusting the volume of the audio signal by performing a digital-to-analog conversion of the audio signal. The plurality of I2S output blocks 164*b* may comprise suitable logic, circuitry, and/or code that may enable processing audio information in accordance with the I2S interface. The plurality of capture registers 165 may comprise suitable logic, circuitry, and/or code that may enable storage of captured audio information. The arbitration block 166 may comprise suitable logic, circuitry, and/or code that may enable selecting between the plurality of capture registers 165 for providing feedback to the BF0 130 via the destination FIFOs dfifo0 through dfifo3, for example. The I2S_in 167 may comprise suitable logic, circuitry, and/or code that may enable receiving data in accordance with the I2S interface.

The MS 162, the SPDIF block 163*a*, the HDMI block 163*b*, the arbitration block 166, and the I2S_in 167 may be shared for encoding and decoding path functions. The DAC_VC0 164*a* and the plurality of I2S output blocks 164*b* may be utilized for decoding path functions. The plurality of capture registers 165 may be utilized for encoding path functions.

The IOP 160 may receive at least one clock or reference signal from the PLL 124. In this regard, the PLL 124 may comprise suitable logic, circuitry, and/or code that enables generation of clock or reference signals for supporting a plurality of data rates, for example. The FCI arbiters 139, 147*a*, 147*b*, 157*a*, and 157*b* may comprise suitable logic, circuitry and/or code that may enable selection from at least one output signal that may result from an FM 104 stage for communication to another stage in the FM 104. The FCI arbiters may utilize a state-machine that enables a two-level of priority round robin approach, for example. The FCI mergers 138, 149*a*, 149*b*, and 159 may comprise suitable logic, circuitry, and/or code that may enable merging at least one output signal that may result from an FMM 104 stage for communication to another stage in the FMM 104.

In the exemplary embodiment of the invention disclosed in FIG. 1D, the FMM 104 may enable 24 playbacks via 48 channels, 24 FIFOs, and/or 48 ring buffers, of two channels for each playback. In an exemplary embodiment of the invention, the FMM 104 may also enable 4 captures via 8 channels, 4 FIFOs and/or 8 ring buffers, of two channels per capture. The FMM 104 may also enable 8 outputs, that is, 16 channels, of stereo or multi-channel outputs, for example. The outputs may comprise an SPDIF output for PCM or compressed audio, a DAC output for down-mixed stereo audio, at least two I2S outputs for 7.1 channels and for down-mixed stereo, and/or an HDMI output that may be shared with other output formats. The FMM 104 may also enable an I2S input that may be implemented within the IOP 160 instead of the BF0 130, for example, to enable the IOP 160 to handle the I2S input and I2S output clocks based on the PLL 124 since the BF0 130 may operate based on a system clock.

The FMM 104 disclosed in FIG. 1D may enable a multichannel program that allows a channel group to be processed in the BF0 130, SRC0 140a, SRC1 140b, DP0 150a, DP1 150b, and/or the IOP 160. In this regard, each channel pair within a channel group may share a group identifier (ID). The channels in a group may be in a consecutive channel ID sequence. The group ID number may be the first channel pair ID or pipeline FIFO, for example. Arbiters associated with the pipeline buffer may treat the channel group as a single client, that is, a first client request to the arbiter may be handled when the remaining clients in the group also make a request. Once the request is granted, each channel pair may be processed in the same sequence as the channel pair ID sequence in a group. This approach may ensure channel synchronization across the FMM data path and may also simplify the mixing coefficient alignment.

The FMM 104 disclosed in FIG. 1D may also support the use of metadata information. The metadata may be part of secondary audio syntax that carries the dynamic mixing coefficients between the primary and secondary and the dynamic coefficients updating in mixing functions that may be required to align with the secondary audio frame boundary. The metadata message and frame information may be passed from the decode DSP 102 to the FMM 104 and then utilized to control mixing operations in the DP0 150a and/or the DP1 150b in order to relax timing requirements to achieve the alignment. In this regard, the FMM 104 may support metadata buffers, pre-formatted message, message unpackers, PCM tagging, and/or dual ping-pong coefficient banks in DP0 150a and/or the DP1 150b and the MI as control interface, for example.

The FMM 104 disclosed in FIG. 1D may enable a sample rate conversion pipeline block separate from the data path blocks to allow multiple sample rate conversion operations. In this regard, the sample rate conversion functions supported may comprise high quality SRC, that is, SRC with better than −120 dB noise suppression, for example, with ratios of 4 to 1, 1 to 4, 2 to 1, and/or 1 to 2. The sample rate conversion functions may also comprise loop back path to support serial SRC operations and/or linear interpolation of the ratio between 0 and 2, for example.

The FMM 104 may utilize a common internal interface (FCI) in various components to enable the components to be added or removed based on feature requirements without producing interface compatibility issues among the various FMM 104 components. The FCI may utilize a 24-bit data bus, for example, and a plurality of signals. The plurality of signals supported by the FCI may comprise a request (REQ) signal, an acknowledge (ACK) signal, a no acknowledge (NOACK) signal, an identification (ID) signal, a data (DATA) signal, a tag (TAG) signal, channel indicator (CH_LEFT0_RIGHT1) signal, for example.

The REQ signal may be an input signal that may be utilized for requesting a pair of left and right samples. In an exemplary embodiment of the invention, the REQ signal may be high on rising edge of system clock when there is a data request, and low when a second ACK signal is high or when a NOACK signal is high. Generally, the REQ signal may be responded with, for example, two consecutive ACK signal, the first may be a left channel sample and tag and the second may be a right channel sample and tag. When an output client of an FCI is not enabled, a NOACK signal may be outputted and a REQ signal may be de-activated. The ACK signal may be an output signal that may be utilized for acknowledging a requesting block. Each request may be responded with two ACK signals, for example. Each ACK signal may be one clock wide. The NOACK signal may be an output signal that may be utilized to indicate no acknowledgement when the current client is not enabled or when the request client ID is invalid, for example. A NOACK signal may terminate the request to a disabled block and prevents the state machine from hanging or from a dead lock.

The ID signal may be an input signal that may comprise a plurality of bits and that may correspond to identification of an output channel pair in a pipeline block. For example, the ID signal may be utilized to identify clients inside a block within the FMM 104 and/or to identify blocks within the FMM 104. The DATA signal may be an output signal that may comprise a plurality of bits, which may correspond to left or right channel samples. A portion of the DATA signal may be utilized for playback data, while another portion may be utilized for capture data since capture data may be PCM or compressed, where the compressed data may be, for example, 16 bits or 32 bits. The data in the DATA signal may be left channel sample when the CH_LEFT0_RIGHT1 signal is low and right channel sample when the CH_LEFT0_RIGHT1 signal is high. The DATA signal may be valid when the ACK signal is high on the rising edge of system clock, for example.

The TAG signal may be an output signal that may comprise a plurality of bits and that may correspond to left or right channel sample tags. The TAG signal may be a left channel sample tag when the CH_LEFT0_RIGHT1 signal is low and a right channel sample tag when the CH_LEFT0_RIGHT1 signal is high. The TAG signal may be valid when the ACK signal is high on the rising edge of system clock, for example. The CH_LEFT0_RIGHT1 signal may be an output signal that may be utilized to indicate left channel samples when it is low and right channel when it is high. The CH_LEFT0_RIGHT1 signal may be valid when the ACK signal is high on the rising edge of system clock, for example.

For some applications, such as for some Blu-ray specifications, metadata may be specified in the secondary audio which carries the dynamic coefficients for audio mixing between the primary and the secondary audio program. In this regard, the coefficients may require alignment with the secondary audio frame boundary during the mixing operation. Moreover, the coefficients in the metadata may be dynamically updated as often as every frame, for example.

Since the mixing operation between the primary and the secondary decoded PCM may be performed by the FMM 104 and there may not be frame information available either in decoded PCM or in existing mixing hardware, some data paths from the decode DSP 102 to the mixing hardware in the FMM 104 may be needed to carry both frame information and coefficients, for example. Moreover, since the coefficients utilized in the mixing operation may need to be updated in correct frame boundary at the appropriate time during mixing, a synchronization interface may be needed between FMM 104 mixing hardware and the decode DSP 102.

Figure 1E:
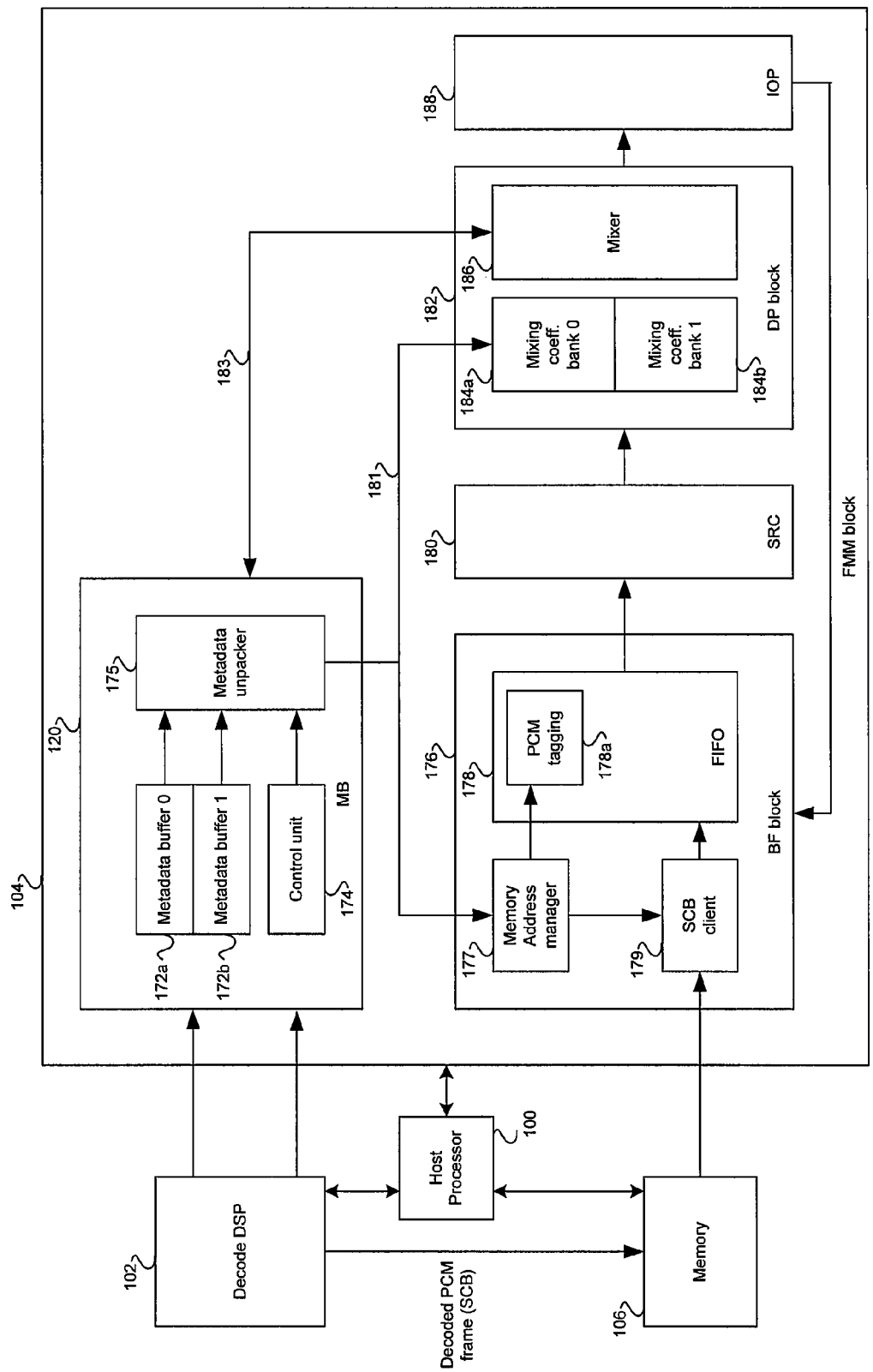
FIG. 1E is a block diagram illustrating exemplary metadata flow and operation between the decode DSP and the FMM block, in accordance with an embodiment of the invention.

FIG. 1E is a block diagram illustrating exemplary metadata flow and operation between the decode DSP and the FMM block, in accordance with an embodiment of the invention. Referring to FIG. 1E, there is shown the host processor 100, FMM 104, the decode DSP 102, and the memory 106 disclosed in FIG. 1A. The FMM 104 may comprise an MB block 120, a BF block 176, an SRC block 180, a DP block 182, and an IOP block 188. The MB block 120 may comprise a first metadata buffer (metadata buffer 0) 172a, a second metadata buffer (metadata buffer 1) 172b, a control unit 174, and a metadata unpacker 175. The BF block 176 may comprise a memory address manager 177, a decoded PCM frame (SCB) client 179, and a FIFO 178. The FIFO 178 may comprise a PCM tagging block 178*a*. The DP block 182 may comprise a first mixing coefficients bank (mixing coeff. bank 0) 184*a*, a second mixing coefficients bank (mixing coeff. bank 1) 184*b*, and a mixer 186. At least a portion of the components disclosed in FIG. 1E may correspond to the FMM 104 components disclosed in FIG. 1D.

The decode DSP 102 may generate metadata messages that may be communicated to the MB block 120 and/or decoded PCM frames that may be communicated to the BF block 176 via the memory 106, for example. The metadata buffers 172*a* and 172*b* may comprise suitable logic, circuitry, and/or code that may enable storage of metadata messages from the decode DSP 102 via a bus. The control unit 174 may comprise suitable logic, circuitry, and/or code that may enable processing of a metadata message counter from the decode DSP 102 via a bus. The metadata message counter may be utilized to indicate the number of metadata messages available in a metadata buffer.

The metadata unpacker 175 may comprise suitable logic, circuitry, and/or code that may enable generation of mixing coefficient information and/or a start of frame indicator from the information generated and/or stored in the metadata buffers 172*a* and 172*b* and the control unit 174. There may be more than one metadata unpacker 175 to enable more than one data stream or path, for example. The metadata unpacker 175 may communicate, via the signal 181, for example, a frame start indication to the BF block 176 and the mixing coefficient information to the DP block 182. The MB block 120 may also enable selection of the mixing coefficients bank 184*a* or the mixing coefficients bank 184*b* via the signal 183, for example.

The memory address manager 177 may comprise suitable logic, circuitry, and/or code that may enable management of memory addresses. In this regard, the memory address manager 177 may utilize the frame start indicator provided by the metadata unpacker 175. The SCB client 179 may comprise suitable logic, circuitry, and/or code that may enable receiving of decoded PCM frame information from the memory 106. The SCB client 179 may also receive information from the memory address manager 177 for processing the received decoded PCM frame. The FIFO 178 may comprise suitable logic, circuitry, and/or code that may enable first-in first-out storage of processed decoded PCM frame information. The PCM tagging 178 may comprise suitable logic, circuitry, and/or code that may enable tagging the start of a processed decoded PCM frame in the FIFO 178. In this regard, the PCM tagging 178*a* may utilize at least one signal indicating start of frame information provided by the memory address manager 177, for example.

The SRC block 180 may comprise suitable logic, circuitry, and/or code that may enable sample rate conversion of the processed decoded PCM frame from the BF block 176. The mixing coefficient banks 184*a* and 184*b* may comprise suitable logic, circuitry, and/or code that may enable storage of mixing coefficients communicated from the MB block 120 via the signal 181. The mixer 186 may comprise suitable logic, circuitry, and/or code that may enable selection of a set of mixing coefficients from the mixing coefficient banks 184*a* and 184*b* for mixing the sample rate converted PCM frame from the SRC block 180. The mixer 186 may enable mixing of primary audio information, for example, 7.1 channels primary audio supporting seven primary speakers and a subwoofer that may be referred to as an low frequency effects (LFE) channel, and secondary audio information, for example, 5.1 channel secondary audio supporting five secondary speakers and a subwoofer, and/or 8 channel of mono sound effects at 96 KHz, for example, based on corresponding metadata information to generate mixed output audio data. The IOP 188 may comprise suitable logic, circuitry, and/or code that may enable pulling of the generated mixed output audio data through a plurality of pipeline stages. The plurality of pipeline stages may be at least one or more of the following: a buffering stage, for example, BF block 176, a sample rate conversion stage, for example, SRC block 180, a data processing stage, for example, DP block 182, and an input/output stage, for example, IOP block 188.

In operation, the metadata and the frame information may be passed and stored into buffers in the MB block 120 when the secondary audio program is decoded in the decode DSP 102. The metadata and/or the frame information may be stored in the metadata buffers 172*a* and/or 172*b*. Moreover, both coefficients and frame information may be communicated to the BF block 176 and the DP block 182 configuration registers at the appropriate time to achieve the alignment of mixing coefficient with frame boundary. A relaxed timing control may be achieved by utilizing a message counter as an interface between the metadata unpacker 175 and the decode DSP 102, a message index between the metadata unpacker 175 and the DP block 182 with ping-pong coefficient banks 184*a* and 184*b*.

In this regard, the metadata buffers 172*a* and 172*b* may store preformatted messages from the decode DSP 102 written through a bus when a secondary audio frame is decoded. Since there may be various data flows for the decode and encode paths in the FMM 104, various metadata buffers may be implemented to allow corresponding streams of metadata messages to be passed from the decode DSP 102 to the FMM 104 in parallel. The metadata unpacker 175 may enable processing and passing of the message to various FMM 104 configuration registers in non-restrictive timing. There may be an 8-bit message counter in the metadata block 120, for example. When a new message is stored in a metadata buffer by the decode DSP 102, the counter may be incremented by the decode DSP 102. The counter may be decremented when a message is processed and sent to the BF block 176 and/or to the DP block 182 by the metadata unpacker 175. The metadata unpacker 175 may start to process a message when the message counter is greater than 0 and an input control signal from the DP block 182 meets one or more conditions. These conditions may be dynamic or may be predetermined. In an exemplary embodiment of the invention, two metadata unpackers 175 may be implemented for two streams of metadata messages, for example. The coefficients in one mixing coefficient bank in the DP block 182 may be updated from the metadata block 120 while the other bank coefficients is being read for mixing operations.

An exemplary metadata message may comprise a frame start address (frame_start_address) signal of decoded PCM frame in ring buffer, an index such as a 4-bit metadata index (MI), a valid bit, and/or mixing coefficients for both primary and secondary audio, for example. The metadata unpacker 175 may communicate the frame_start_address, the MI, and the valid bit to BF block 176 and the mixing coefficients to the DP block 182 via the signal 181, for example.

In an exemplary embodiment of the invention, a tag such as an 8-bit tag per PCM sample may be associated with each 24-bit PCM to carry the side information from the BF block 176, the SRC block 180, the DP block 182, and/or an input-output block (IOP), such as the IOP 160 in FIG. 1D, to enable these blocks to utilize the side information when each PCM is received and processed. The side information may comprise a PCM valid bit, a PCM inserted bit, and the metadata index. The 4-bit MI may be directly copied from a metadata message and may be incremented by the decode DSP 102 to follow the message sequence. When a new frame_start_address and a newly incremented MI are loaded into the BF block 176 configuration registers, the valid bit may be set to 1 in the message by the decode DSP 102. The frame_start_address may be utilized by the BF block 102 to identify the first PCM sample in the received frame and the newly incremented MI may be placed in the 8-bit PCM tag for the PCM samples of the frame. The MI in the PCM tag may be received later by the DP block 182 for mixing between the primary and the secondary audio. In some instances, the least significant bit of the MI may be utilized by the DP block 182 to select one of the two mixing coefficient banks for the mixing operations.

The MI in the PCM tag received by the DP block 182 may also be outputted back to the metadata unpacker 175. The MI in the PCM tag may be utilized by the metadata unpacker 175 along with the message counter as a control interface to determine when the next metadata message may need processing and may need to be sent to the BF block 176 and/or the DP block 182. The MI may indicate to the metadata unpacker 175 the last message received by the BF block 176 and the DP block 182 and which mixing coefficient bank the DP block 182 may be accessing. In instances when the message counter may be greater than zero, for example, and the MI in next message in the metadata buffer may be the index from the DP block 182 plus 1, then the next message in the buffer may be processed and communicated. In an exemplary embodiment of the invention, there may be two MI interfaces between the DP block 182 and each of the metadata unpackers 175 to allow two metadata message streams.

Figure 1F:
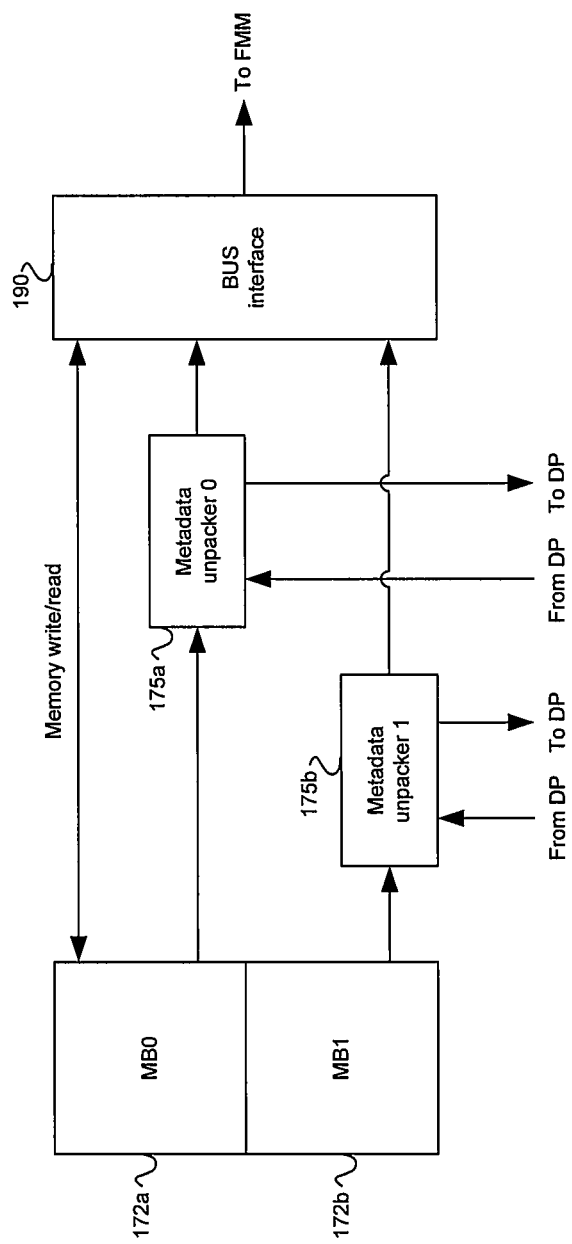
FIG. 1F is a block diagram illustrating an exemplary metadata block architecture, in accordance with an embodiment of the invention.

FIG. 1F is a block diagram illustrating an exemplary metadata block architecture, in accordance with an embodiment of the invention. Referring to FIG. 1F, there is shown a portion of the metadata block 120 that may comprise the first metadata buffer (metadata buffer 0) 172a, the second metadata buffer (metadata buffer 1) 172b, a first metadata unpacker (metadata unpacker 0) 175a, a second metadata unpacker (metadata unpacker 1) 175b, and a BUS interface 190. The metadata unpackers 175a and 175b may be similar or substantially the same as the metadata unpacker 175 disclosed in FIG. 1E. The BUS interface 190 may comprise suitable logic, circuitry, and/or code that may enable communication between the MB block 120 and at least one component of the FMM block 104, for example. In this regard, the BUS interface 190 may communicate with the BF block 176, the SRC block 180, and/or the DP block 182.

One of the metadata buffers 172a and 172b may be utilized for audio mixing in playback path and the other metadata buffer for encode path, however, a metadata buffer need not be limited to just playback path or encode path operations. In an exemplary embodiment of the invention, when the encode and decode paths are enabled, the decode DSP 102 may store the same message to both metadata buffers and may control the various message counters. In instances where two message counters are utilized, the decode DSP 102 may store one message to one of the metadata buffers 172a and 172b and may control two message counters and two address sets in one of the buffer. In another instance, the two independent message streams may flow through the two metadata buffers 172a and 172b and the two metadata unpackers 175a and 175b in the MB block 120, and the two flows may be utilized to control two independent groups of mixers. The metadata buffers 172a and 172b may be implemented in a single port RAM, for example. Each entry in a metadata buffer may be addressed in the RBUS address range.

There may be one or more hardware configuration registers in each of the metadata unpackers 175a and 175b. The MB block 120 may be configured to perform a plurality of operations. For example, when an MB enable signal is zero, the corresponding metadata unpacker may be reset, and an appropriate metadata message counter signal and other internal states may also be reset to zero. In another instance, either a host processor 100, or the decode DSP 102 may configure the MB block 120 address registers. In this regard, the appropriate metadata unpacker may be enabled based on a mixer select signal that indicates the last mixer in the DP block 182 to utilize the metadata unpacker.

When the decode DSP 102 receives and decodes new metadata from the secondary audio program and may generate a new metadata message, the decode DSP 102 may write a new metadata message into a metadata buffer in the MB block 120. The decode DSP 102 may also update the metadata buffer write address and may increment a corresponding metadata message counter. The message counter may be decremented after one block of metadata is processed by the metadata unpackers 175a and/or 175b.

When the metadata unpackers 175a and/or 175b are enabled, the metadata unpackers may detect that there are new metadata messages in the metadata buffer when the metadata message counter is non-zero. The metadata unpackers 175a and/or 175b may decode the metadata MI and the block length in the message header. In this regard, in instances when the message is a first message since the occurrence of a reset, the metadata unpackers 175a and/or 175b may process the metadata message as soon as possible. In instances when the message is not the first message since a reset, the metadata unpackers 175a and/or 175b may compare the MI in the new message in the buffer with the MI from the mixer. When the MI in the metadata buffer is equal to the MI in the mixer plus 1, the metadata unpacker may write each register content in the message to the bus address to both the FB block 176 and the DP block 182. After the entries in the message are processed, the metadata unpacker may decrement the metadata message counter in the configuration register.

In instances when the MI in the metadata buffer may not be equal to the MI in the mixer plus 2, the metadata unpacker may wait until the MI in the mixer increments to process the message as soon as possible. This may indicate that the previous message has not been used by the BF block 176 and the DP block 182 yet, and the next message will be waited until MI in the metadata buffer is equal to the MI in the mixer plus 1. In instances when the MI in the metadata buffer may be equal to the MI in the mixer or may be greater than the MI in the mixer plus 2, the next message may not be in the right sequence and an error signal may be generated by the metadata unpacker. In this regard, the metadata unpacker may wait until the decode DSP 102 may generate a reset signal.

Since the metadata buffer may be implemented utilizing in a single port RAM, for example, a write or a read such as an external RBUS write or a read from the decode DSP 102 or the host processor may have a higher priority than an internal read. The messages may be updated up to once per frame, for example. The message processing rate may be limited by the time it takes a pair of samples to go from the ring buffer to the mixer output. In instances where the message input rate may be higher than that processed by the FMM block 104, a metadata buffer overflow condition may occur.

Figure 2A:
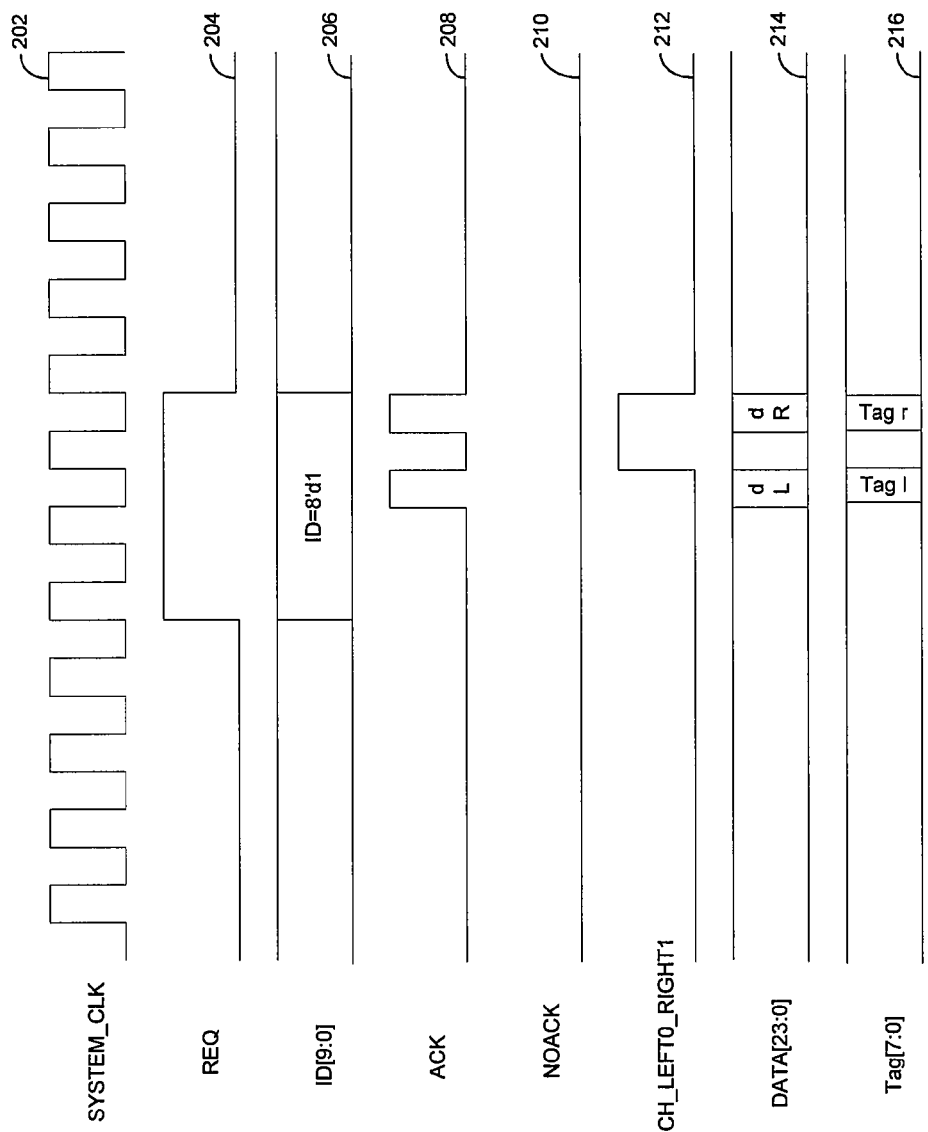
FIG. 2A is an exemplary timing diagram illustrating a flexible multiplexer and mixer common internal interface, in accordance with an embodiment of the invention.

FIG. 2A is an exemplary timing diagram illustrating a flexible multiplexer and mixer common internal interface, in accordance with an embodiment of the invention. Referring to FIG. 2A, there is shown a system clock signal (SYSTEM_CLK) 202, a request signal (REQ) 204, a 10-bit identification signal (ID[9:0]) 206, an acknowledgement signal (ACK) 208, a no acknowledgement signal (NOACK) 210, a channel status signal (CH_LEFT0_RIGHT1) 212, a 24-bit data signal (data[23:0]) 214, and an 8-bit tag signal (tag[7:0]) 216. It should be recognized that the exemplary lengths of the identification signal 206, data signal 214 and tag signal 216 are not limited to the bit lengths that are illustrated. Accordingly, other exemplary bit lengths may be utilized without departing from the breadth or scope of the invention.

The flexible mixer and multiplexer (FMM) common internal (FCI) interface may enable standardization of the interface between internal FMM blocks. The request signal (REQ) 204 may indicate a request for a pair of left channel and right channel samples. The REQ 204 may be set HIGH on the rising edge of the system clock signal (SYSTEM_CLK) 202 when there is a data request. The REQ 204 may be reset to LOW when a second ACK 208 is set HIGH or a NOACK 210 is set HIGH. The ACK 208 may indicate acknowledgement to a requesting block. Each request may be responded with two ACKs. The first ACK may be for a left channel sample, for example, when the channel status signal (CH_LEFT0_RIGHT1) 212 is reset to LOW. The second ACK may be for a right channel sample, for example, when the channel status signal (CH_LEFT0_RIGHT1) 212 is set HIGH. Each ACK may be one clock signal wide, for example. The NOACK 210 may indicate no acknowledgement, in instances where a current client may not be enabled or a requested client ID is invalid. The NOACK 210 may terminate the request to a disabled block and may prevent the state machine from hanging or being in a dead lock.

An identification signal such as the 10-bit identification signal (ID[9:0]) 206 may indicate the ID for an output channel pair in a FMM pipeline block. For example, a 6-bit ID[5:0] may be utilized for clients in the FMM block 104 such as BF block 176, SRC block 180, DP block 182 or IOP block 160. The exemplary 24-bit data signal (data[23:0]) 214 may indicate the data utilized for playback. The data may be a left channel sample, for example, when the channel status signal (CH_LEFT0_RIGHT1) 212 is set HIGH. The data may be a right channel sample, for example, when the channel status signal (CH_LEFT0_RIGHT1) 212 is reset to LOW. The exemplary 24-bit data signal (data[23:0]) 214 may be valid when the ACK 208 is set HIGH on the rising edge of the SYSTEM_CLK 202. In another exemplary embodiment of the invention, the data signal may be a 32-bit data signal data[31:0]. The exemplary 8-bit tag signal (tag[7:0]) 216 may indicate left channel or right channel sample tags. The exemplary tag signal (tag[7:0]) 216 may also indicate a left channel sample tag, for example, when the channel status signal (CH_LEFT0_RIGHT1) 212 is reset to LOW. In an exemplary embodiment of the invention, the tag signal (tag[7:0]) 216 may indicate a right channel sample tag, for example, when the channel status signal (CH_LEFT0_RIGHT1) 212 is set HIGH. The tag signal (tag[7:0]) 216 may be valid in instances when the ACK 208 may be set HIGH on the rising edge of the SYSTEM_CLK 202.

Figure 2B:
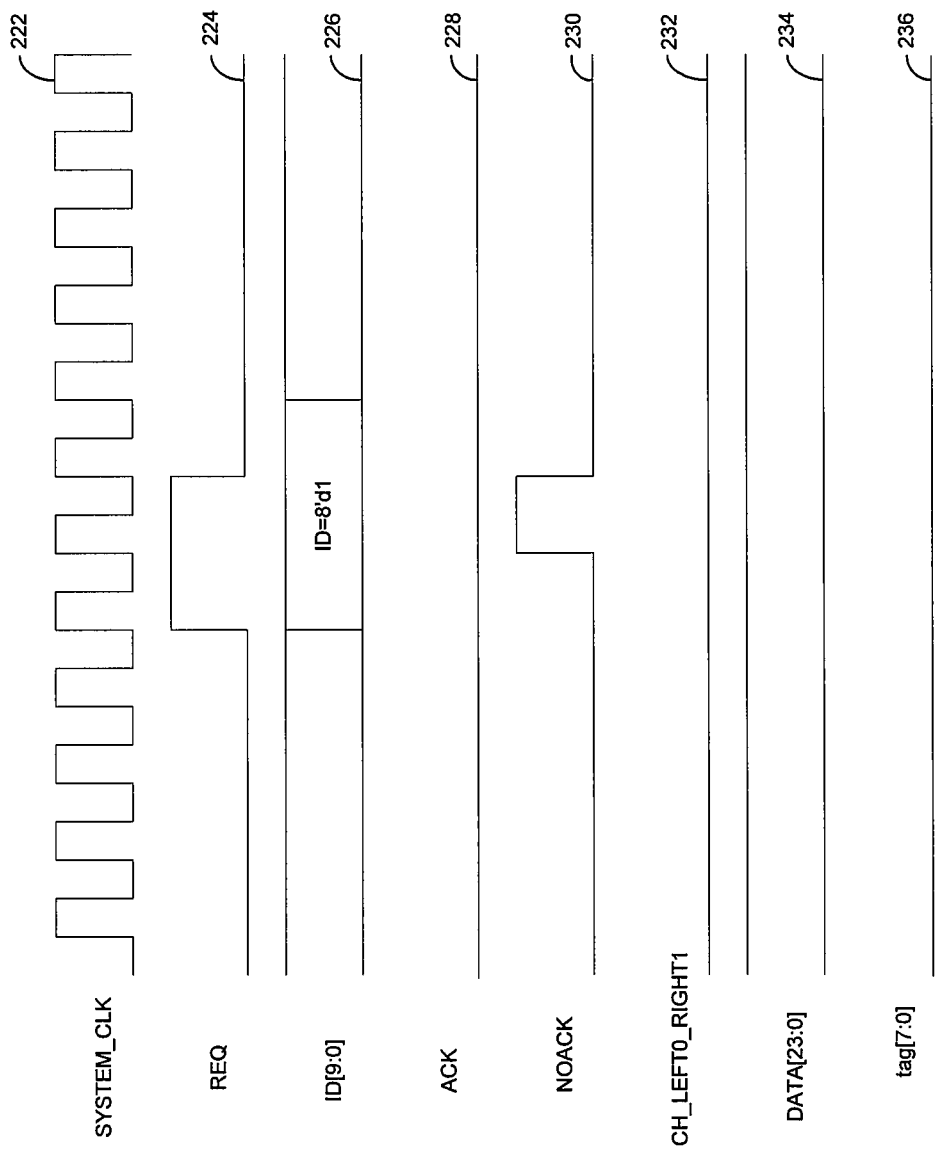
FIG. 2B is an exemplary timing diagram illustrating a flexible multiplexer and mixer common internal interface when a requested client is not enabled, in accordance with an embodiment of the invention.

FIG. 2B is an exemplary timing diagram illustrating a flexible multiplexer and mixer common internal interface when a requested client is not enabled, in accordance with an embodiment of the invention. Referring to FIG. 2B, there is shown a system clock signal (SYSTEM_CLK) 222, a request signal (REQ) 224, a 10-bit identification signal (ID[9:0]) 226, an acknowledgement signal (ACK) 228, a no acknowledgement signal (NOACK) 230, a channel status signal (CH_LEFT0_RIGHT1) 232, a 24-bit data signal (data[23:0]) 234, and an 8-bit tag signal (tag[7:0]) 236. The various signals may be substantially as described in FIG. 1G. It should be recognized that the exemplary lengths of the identification signal 226, data signal 234 and tag signal 236 are not limited to the bit lengths that are illustrated. Accordingly, other exemplary bit lengths may be utilized without departing from the breadth or scope of the invention.

In an exemplary embodiment of the invention, in instances when a requested client may not be enabled, the NOACK 230 may be set HIGH, and the REQ 224 may be de-activated after the NOACK 230 is reset to LOW. In accordance with an embodiment of the invention, the FCI interface may be enabled to have minimum signal counts with sufficient information flow and may be cost effective for crossbar functions utilized in the DP block 182. The FCI interface may also be enabled to handle various data flow and error conditions.

The data flow in the FMM block 104 may be a pull model, for example. There may be two types of data flows in the FMM block 104. For example, one type of data flow may be the playback flow for audio decode data from a decode ring buffer to the output I/O. Another type of data flow may be the capture flow for audio encode data from a decode ring buffer to the capture registers 165 in the IOP 160, and then to a plurality of encode ring buffers. The data in the playback path may flow from the playback ring buffer to the BF block 176, SRC block 180, DP block 182, and the IOP block 160. The IOP block 160 may be enabled to control the data rate and timing through time-based, or rate managed or PLL clocks such as I2S or SPDIF sample clocks, or a rate manager in DAC. The data may be pulled by IOP 160 from DP block 182, SRC block 180, and BF block 176 in sequence. The data in the capture path may be pulled from the BF block 176 to the IOP 160, and rate controlled by IOP 160. The captured data may be stored into a ring buffer through capture FIFO 178 in BF block 176 directly from IOP 160 without extra pipeline buffers.

In accordance with an embodiment of the invention, each pipeline stage may comprise a single processing unit and multiple FIFO buffers that may share a single RAM as the pipeline buffer. Each channel pair may use one FIFO, for example. The FMM block 104 may process the data to fill a FIFO when there is a sample pair of space available in the FIFO, and after a request is granted by the round-robin arbitration among the multiple FIFOs. Each processing unit may be designed to have sufficient cycles to process all the requests from all the FIFOs during a particular sampling time, for example, 48 KHz sample time or 2250 cycles for a system clock of 108 MHz. There may be two round-robin arbitration groups. For example, one round-robin arbitration group may be a high priority group and the other round-robin arbitration group may be a low priority group. Arbitration schemes other than a round-robin arbitration scheme may be utilized. Each client may be configured to either one of the round-robin arbitration groups. For example, a client of 96 KHz or 192 KHz sampling rate may be programmed to a high priority round-robin arbitration group and a client of 48 KHz may be programmed to a low priority round-robin arbitration group. The FMM block 104 may be designed to avoid requiring the double number of cycles when there are less than half of clients with double sampling rate in a round-robin arbitration group.

In accordance with an exemplary embodiment of the invention, the FIFO in a pipeline buffer may be sized to hold at least two consecutive fetches from a next stage. Each FIFO in the BF block 176 may store up to 8 pair samples to support up to 4 pairs for each fetch from the SRC block 180 in instances when the SRC ratio may be 4 to 1. The FIFO in the BF block 176 may be enabled to support, for example, 2 pairs for each fetch from the SRC block 180, and 10 pairs for each fetch from the DP block 182, where 8 pairs support the feed-back path to the SRC block 180, and an extra 2 pairs may support two read addresses in each DP FIFO.

In accordance with another embodiment of the invention, the blocks in the FMM block 104 may be reset by the same synchronous reset signal, for example. The pipeline buffers may be initialized to full with an invalid PCM signal. The BF playback FIFO 178 may be initialized to half full with invalid data to avoid double DRAM requests during FIFO transits from empty to full in a start up condition. The data flows may be initiated by IOP 160 requests for the data from DP 182 pipeline buffers. The valid PCM samples may be available and ready to flow after a run condition is met in BF 176 playback. If a requested block output is not enabled or not a valid output, an invalid PCM pair may be communicated. If a request ID is illegal, a NOACK 230 may be issued. If a requested block output is enabled, two ACKs may be issued. The outputted samples may be either valid if the PCM valid bit (PV) is one or invalid, if the PV is zero, for example. If a request for a group channel is received, all the channel pairs in the group may be requested and acknowledged in the same sequence as their channel pair IDs. The arbiter may check all channel samples available before being acknowledged with valid samples, or all channel samples may be labeled invalid or INSERTED in sequence.

In the BF block 176, a PCM pair may be valid after the first pair samples are received from a ring buffer. If the run condition is not yet met, a pair of invalid PCM samples may be stored in the pipeline buffer when there is a pair of sample space available. After the first samples are received, the previous flow on condition may be met, and the playback FIFO 178 may be under-run, the INSERTED bit may be set to one and the sample pair may be either a repeat from a previous pair or zero based on the playback output configuration.

In the SRC 180, if a PV bit in the PCM tag changes from invalid to valid, the PCM pair may ramp-up and/or ramp-down from valid to invalid, if the ramp feature is enabled. Else, the PV bit may be copied to the output PCM. In the DP block 182, the MI bits from the first mixer input may be copied to its output. The PV bit may be copied to the output PCM if no mixing is enabled, and the PV bit may be set to one if one of the inputs is valid. Else, the PV bit may be set to zero, and the INSERTED bit may be set to one when all the inputs are tagged with the INSERTED bit. In the IOP 160, if the input is compressed data, and either PV bit is zero or the INSERTED bit is one, a pause burst may be issued in the SPDIF 112a. For PCM output in I2S, SPDIF, or DAC, samples with zero value may be outputted until the valid PCM pair is received.

The PCM audio samples may be tagged to convey information to the BF block 176, SRC 180, DP block 182 and IOP 160. The metadata index (MI) may indicate the sequence of the received metadata. The MI may be a 4 bit counter, for example, and may be incremented by the decode DSP 102 after a secondary audio frame with metadata is decoded and a new metadata is generated. The PCM audio samples may be either zero in value or may be repeated from a previous input channel pair due to pipeline buffer underflow based on the value of an INSERTED bit in the PCM tag. The PCM audio samples may be either fetched from ring buffers or may be inserted due to under-run based on the value of a PCM valid bit. The PCM tag may be inserted by the BF block 176 when a pair of PCM audio samples is read out from a source FIFO 178 in the BF block 176. The PCM tag may be modified in subsequent processing pipelines of SRC 180 and DP block 182 to preserve or update the PCM information after processing.

When the PCM audio samples are processed in sequence of pairs, each channel pair output may be assigned with a channel interface ID. The channel interface ID may be a 10 bit value, for example, where the least significant 6 bits may identify an output channel pair and the most significant 4 bits may identify at least one of: a BF block 176, a SRC 180, a DP block 182 or IOP 160. Other bit allocations may also be utilized. There may be a unique ID for each input and output channel pair in a processing block. The request for processing an input may be based on available pipeline buffer space and the arbitration in each processing block may be based on a round-robin arbitration algorithm in the sequence of the channel pair IDs. The multiple channel pairs may be processed in a channel group in the BF block 176, SRC 180, DP block 182 and IOP 160.

The DP block 182 may comprise a plurality of mixers 186, for example, 8 mixers, each with two pairs of output channels. Each output channel may have a separate enable and a separate ID. One pair of output channels may be communicated to the IOP 160, and the other pair of output channels may be fed back as an input to the DP block 182. Notwithstanding, both pairs of output channels may be communicated to the IOP 160 and the timing skew between the output channels may be less than or equal to twice the sample time. When one pair of output channels is fed back to the SRC, for example, SRC 140a for down sampling conversion, the other pair of output channels may be communicated to the IOP 160.

In an exemplary embodiment of the invention, the DP block 182 may be enabled to implement 16 to 1 channel mixing when a plurality of input channel pairs such as 8 input channel pairs are active. Each input PCM audio sample may be identified by a channel interface ID. The channel interface ID may be a 10 bit value, for example. Each input PCM audio sample and output PCM audio sample may be enabled and/or disabled dynamically during run time. Each input PCM audio sample may have two sets of mixing coefficients in two mixing coefficient banks, mixing coefficient bank 0 184a and mixing coefficient bank 1 184b. Each set of mixing coefficients may be selected or addressed by a bit, for example, the first bit in the metadata index (MI), MI[0] bit. The MI in the first channel pair input of the mixer 186 may be utilized to select the particular mixing coefficient bank for all the inputs of a mixer 186. There may be four mixing coefficients per input channel pair, for example. There may be two mixing coefficients for the left output channel and two mixing coefficients for the right output channel, for example.

Each output may have two volume coefficients, one for the left channel and another for the right channel. Each volume control may support the coefficient transition smoothing when the volume coefficient is updated. An input channel pair may be shared by a plurality of mixer inputs. A mixer input may be tracked by its input FIFO read pointer. The input PCM audio samples may be received and processed after the enables are set and cleared at the start-up and finish conditions.

The mixer output for the left channel may be represented by the following exemplary equation:

$$ML\_out = ML\_out + CLL*SPL + CRL*SPR$$

where CLL is the left channel mixing coefficient L, SPL is the left channel sample, CRL is the right channel mixing coefficient L, and SPR is the right channel sample. The mixer output for the right channel may be represented by the following exemplary equation:

$$MR\_out = MR\_out + CLR*SPL + CRR*SPR$$

where CLR is the left channel mixing coefficient R, SPL is the left channel sample, CRR is the right channel mixing coefficient R, and SPR is the right channel sample.

In accordance with an embodiment of the invention, a method and system for a flexible multiplexer and mixer 104 may comprise an interface buffer, for example, the BF block 176 that enables interfacing a memory 106. The FMM block 104 may comprise at least one sample rate converter, for example, SRC block 180 that converts a sampling rate of audio data stored in the interface buffer, BF block 176. The FMM block 104 may comprise data path circuitry, for example, DP block 182 that enables mixing the sample rate converted audio data. The FMM block 104 may comprise output circuitry that enables pulling the mixed sample rate converted audio data. The FMM block 104 may comprise metadata circuitry, for example, MB 120 that enables generation of control data for the interface buffer, BF block 176 and the data path circuitry, DP block 182. The metadata circuitry, MB 120 may comprise at least one metadata buffer, for example, metadata buffer 0 172a and metadata buffer 1 172b. The metadata circuitry, MB 120 may comprise a control unit 174. The metadata circuitry, MB 120 may comprise a metadata unpacker 175. The metadata unpacker 175 may enable processing of metadata information utilizing a frame start indicator associated with a decoded PCM frame. The processed metadata information may comprise a plurality of mixing coefficients.

The metadata buffers 172a and 172b may enable storage of metadata messages from the decode DSP 102 via a bus. The control unit 174 may enable processing of a metadata message counter from the decode DSP 102 via a bus. The metadata unpacker 175 may enable generation of mixing coefficient information and/or a start of frame indicator from the information generated and/or stored in the metadata buffers 172a and 172b and the control unit 174. There may be more than one metadata unpacker 175 to enable more than one data stream or path, for example. The metadata unpacker 175 may communicate, via the signal 181, for example, a frame start indication to the BF block 176 and the mixing coefficient information to the DP block 182. The MB block 120 may also enable selection of the mixing coefficients bank 184a or the mixing coefficients bank 184b via the signal 183, for example.

The interface buffer, BF block 176 may comprise a memory address manager 177. The interface buffer, BF block 176 may comprise a FIFO buffer 178. The interface buffer, BF block 176 may comprise tagging circuitry, PCM tagging block 178a. The tagging circuitry, PCM tagging block 178a may enable tagging of at least a portion of a decoded PCM frame with a frame start indicator. The memory address manager 177 may enable management of memory addresses. In this regard, the memory address manager 177 may utilize the frame start indicator provided by the metadata unpacker 175. The FIFO 178 may enable first-in first-out storage of processed decoded PCM frame information. The PCM tagging block 178a may enable tagging the start of a processed decoded PCM frame in the FIFO 178. In this regard, the PCM tagging block 178a may utilize at least one signal indicating start of frame information provided by the memory address manager 177, for example.

The data path circuitry, DP block 182 may comprise at least one memory, for example, mixing coefficient bank 0 184a and mixing coefficient bank 1 184b that enables storing mixing coefficients. The data path circuitry, DP block 182 may comprise mixing circuitry, for example, mixer 186. The FMM block 104 may enable pulling of the mixed sample rate converted audio data through each of a plurality of pipeline stages based on an output decoding rate. The FMM block 104 may enable feedback of an output of at least one of the plurality of pipeline stages to an input of a previous stage of at least one of the plurality of pipeline stages. The FMM block 104 may enable merging of an output of the interface buffer, BF block 176 with at least one or both of the following: an output of the SRC block 180 and an output of the data path circuitry, DP block 182.

In accordance with an embodiment of the invention, a method and system for a flexible multiplexer and mixer 104 may comprise a sample rate converter, for example, SRC block 180 that samples received audio data. The mixer 186 may enable mixing of primary audio information, for example, 7.1 channels primary audio supporting seven primary speakers and a subwoofer that may be referred to as an low frequency effects (LFE) channel, and secondary audio information, for example, 5.1 channel secondary audio supporting five secondary speakers and a subwoofer, and/or 8 channel of mono sound effects at 96 KHz, for example, based on corresponding metadata information to generate mixed output audio data. The IOP 188 may enable pulling of the generated mixed output audio data through a plurality of pipeline stages. The plurality of pipeline stages may be at least one or more of the following: a buffering stage, for example, BF block 176, a sample rate conversion stage, for example, SRC block 180, a data processing stage, for example, DP block 182, and an input/output stage, for example, IOP block 188.

The metadata unpacker 175 may be enabled to process the corresponding metadata information utilizing a frame start indicator associated with a decoded PCM frame. The PCM tagging block 178a may be enabled to tag at least a portion of the decoded PCM frame with the frame start indicator. The processed corresponding metadata information may comprise a plurality of mixing coefficients. The mixing coefficient bank 0 184a, and mixing coefficient bank 1 184b may be enabled to store the plurality of mixing coefficients to enable the mixing of primary audio information and secondary audio information based on corresponding metadata information to generate mixed output audio data. The IOP 160 may be enabled to pull the generated mixed output audio data through the data processing path, DP block 182 based on an output decoding rate. The FCI arbiter 139, for example, may be enabled to arbitrate the sampled received audio data based on a priority of the sampled received audio data.

The FMM block 104 may process the data to fill a FIFO when there is a sample pair of space available in the FIFO, and after a request is granted by the round-robin arbitration among the multiple FIFOs. There may be two round-robin arbitration groups. For example, one round-robin arbitration group may be a high priority group and the other round-robin arbitration group may be a low priority group. Each client may be configured to either one of the round-robin arbitration groups.

Another embodiment of the invention may provide a machine-readable storage, having stored thereon, a computer program having at least one code section executable by a machine, thereby causing the machine to perform the steps as described above for a flexible multiplexer and mixer.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for processing audio signals, the system comprising:
one or more circuits that enables sampling of received audio data;
said one or more circuits enables mixing of primary audio information and secondary audio information of said sampled received audio data based on corresponding metadata information to generate mixed output audio data; and
said one or more circuits enables pulling of said generated mixed output audio data through a plurality of pipeline stages.

2. The system according to claim 1, wherein said one or more circuits enables processing of said corresponding metadata information utilizing a frame start indicator associated with a decoded PCM frame.

3. The system according to claim 2, wherein said one or more circuits enables tagging of at least a portion of said decoded PCM frame with said frame start indicator.

4. The system according to claim 2, wherein said processed corresponding metadata information comprises a plurality of mixing coefficients.

5. The system according to claim 4, wherein said one or more circuits enables storage of said plurality of mixing coefficients in at least one mixing coefficient bank to enable said mixing.

6. The system according to claim 1, wherein said one or more circuits enables pulling of said generated mixed output audio data through said data processing path based on an output decoding rate.

7. The system according to claim 1, wherein said one or more circuits enables arbitration of said sampled received audio data based on a priority of said sampled received audio data.

8. The system according to claim 1, wherein said one or more circuits comprises said plurality of pipeline stages, and wherein said plurality of pipeline stages comprises at least one or more of the following: a buffering stage, a sample rate conversion stage, a data processing stage, and an input/output stage.

9. A method for processing audio signals, the method comprising:
mixing primary audio information and secondary audio information of sampled received audio data based on corresponding metadata information to generate mixed output audio data; and
pulling said generated mixed output audio data through a plurality of pipeline stages.

10. The method according to claim 9, comprising processing said corresponding metadata information utilizing a frame start indicator associated with a decoded PCM frame.

11. The method according to claim 10, comprising tagging at least a portion of said decoded PCM frame with said frame start indicator.

12. The method according to claim 10, wherein said processed corresponding metadata information comprises a plurality of mixing coefficients.

13. The method according to claim 12, comprising storing said plurality of mixing coefficients in at least one mixing coefficient bank to enable said mixing.

14. The method according to claim 9, comprising pulling said generated mixed output audio data through said data processing path based on an output decoding rate.

15. The method according to claim 9, comprising arbitrating said sampled received audio data based on a priority of said sampled received audio data.

16. The method according to claim 9, wherein said plurality of pipeline stages comprises at least one or more of the following: a buffering stage, a sample rate conversion stage, a data processing stage, and an input/output stage.

17. A non-transitory machine-readable storage having stored thereon, a computer program having at least one code section for processing audio signals, the at least one code section being executable by a machine for causing the machine to perform steps comprising:
mixing primary audio information and secondary audio information of sampled received audio data based on corresponding metadata information to generate mixed output audio data; and
pulling said generated mixed output audio data through a plurality of pipeline stages.

18. The non-transitory machine-readable storage according to claim 17, wherein said at least one code section comprises code for processing said corresponding metadata information utilizing a frame start indicator associated with a decoded PCM frame.

19. The non-transitory machine-readable storage according to claim 18, wherein said at least one code section comprises code for tagging at least a portion of said decoded PCM frame with said frame start indicator.

20. The non-transitory machine-readable storage according to claim 18, wherein said processed corresponding metadata information comprises a plurality of mixing coefficients.

21. The non-transitory machine-readable storage according to claim 20, wherein said at least one code section comprises code for storing said plurality of mixing coefficients in a mixing coefficient bank to enable said mixing.

22. The non-transitory machine-readable storage according to claim 17, wherein said at least one code section comprises code for pulling said generated mixed output audio data through said data processing path based on an output decoding rate.

23. The non-transitory machine-readable storage according to claim 17, wherein said at least one code section comprises code for arbitrating said sampled received audio data based on a priority of said sampled received audio data.

24. The non-transitory machine-readable storage according to claim 17, wherein said plurality of pipeline stages comprises at least one or more of the following: a buffering stage, a sample rate conversion stage, a data processing stage, and an input/output stage.

\* \* \* \* \*